United States Patent
Vitale et al.

(10) Patent No.: US 8,598,285 B2
(45) Date of Patent: Dec. 3, 2013

(54) PROCESS FOR THE PREPARATION OF POLYMER OF 1-BUTENE

(75) Inventors: Gianni Vitale, Ferrara (IT); Fabrizio Piemontesi, Ferrara (IT); Ines Mingozzi, Ferrara (IT); Isabella Maria Vittoria Camurati, Ferrara (IT)

(73) Assignee: Basell Poliolefine Italia, S.r.l., Milan (IT)

( * ) Notice: Subject to any disclaimer, the term of this patent is extended or adjusted under 35 U.S.C. 154(b) by 0 days.

(21) Appl. No.: 13/384,191

(22) PCT Filed: Jul. 2, 2010

(86) PCT No.: PCT/EP2010/059440
§ 371 (c)(1),
(2), (4) Date: Jan. 13, 2012

(87) PCT Pub. No.: WO2011/006776
PCT Pub. Date: Jan. 20, 2011

(65) Prior Publication Data
US 2012/0116032 A1    May 10, 2012

Related U.S. Application Data

(60) Provisional application No. 61/271,347, filed on Jul. 20, 2009.

(30) Foreign Application Priority Data

Jul. 14, 2009   (EP) ..................... 09165452

(51) Int. Cl.
*C08F 4/44* (2006.01)
(52) U.S. Cl.
USPC .................................... 526/125.4
(58) Field of Classification Search
USPC .................................... 526/125.4
See application file for complete search history.

(56) References Cited

U.S. PATENT DOCUMENTS

| | | | |
|---|---|---|---|
| 4,298,718 A | 11/1981 | Mayr et al. | |
| 4,347,158 A * | 8/1982 | Kaus et al. | 502/105 |
| 4,399,054 A | 8/1983 | Ferraris et al. | |
| 4,469,648 A | 9/1984 | Ferraris et al. | |
| 4,471,064 A * | 9/1984 | Buehler | 502/108 |
| 4,495,338 A | 1/1985 | Mayr et al. | |
| 6,468,938 B1 * | 10/2002 | Govoni et al. | 502/126 |
| 2003/0036594 A1 * | 2/2003 | Tashino et al. | 524/296 |

FOREIGN PATENT DOCUMENTS

| | | |
|---|---|---|
| DE | 3633131 | 3/1988 |
| EP | 34935 | 9/1981 |
| EP | 553805 | 8/1983 |
| EP | 395083 | 10/1990 |
| EP | 0402958 | 12/1990 |
| EP | 553806 | 1/1992 |
| EP | 601525 | 12/1992 |
| GB | 1564460 | 4/1980 |
| WO | WO89/03847 | 5/1989 |
| WO | WO98/44001 | 10/1998 |

OTHER PUBLICATIONS

Machine translation of BASF (DE 3633131).*

* cited by examiner

*Primary Examiner* — Ling Choi
*Assistant Examiner* — Catherine S Branch

(57) ABSTRACT

A process for the preparation of 1-butene homopolymers or 1-butene/alpha olefin copolymers wherein the alpha olefins are selected from ethylene, propylene or alpha olefins of formula $CH_2=CHZ$ wherein Z is a $C_3$-$C_{20}$ alkyl radical, comprising contacting 1-butene or 1-butene and one or more alpha olefins under polymerization conditions in the presence of a catalyst system comprising:
(a) a solid component comprising a Ti compound and an internal electron-donor compound supported on $MgCl_2$
(b) an alkylaluminum cocatalyst; and
(c) a compound of formula (I) as external donor.

8 Claims, No Drawings

PROCESS FOR THE PREPARATION OF POLYMER OF 1-BUTENE

This application is the U.S. national phase of International Application PCT/EP2010/059440, filed Jul. 2, 2010, claiming priority to European Application 09165452.5 filed Jul. 14, 2009 and the benefit under 35 U.S.C. 119(e) of U.S. Provisional Application No. 61/271,347, filed Jul. 20, 2009; the disclosures of International Application PCT/EP2010/059440, European Application 09165452.5 and U.S. Provisional Application No. 61/271,347, each as filed, are incorporated herein by reference.

The present invention relates to a process for the preparation of 1-butene-based polymer having elastomeric properties by using a catalyst system containing titanium magnesium and a particular class of external donors.

Certain butene-1 (co)polymers having low isotacticity and elastomeric behavior are known in the art. They can be used as components of blends with other polyolefins, or polymeric products, in order to modulate particular properties such as sealing strength, flexibility and softness of the plastic materials. In particular, these butene-1 (co)polymers can be used as additives in production of roofing boards, road surfacing materials, and sealing compositions or used as oil viscosity improvers. In order to be used for these purposes, important characteristics are good processability and a suitable compromise between plastic and elastomeric properties that, in turn, derives from a good balance between the crystalline and amorphous fractions of the polymer.

EP 34935 relates to a process for preparing a solid titanium trichloride catalyst component, comprising as electron donor anisole. The catalyst component is said to increase the isotacticity of the obtained polymers.

WO 89/03847 relates to a process for preparing an amorphous propylene/higher 1-olefin copolymer by using a catalyst system that can comprise anisole as electron donor. This document does not relate to 1-butene polymerization.

The applicant found that by using a particular class of external donor based on anisole it is possible to get a 1-butene based polymer having a particularly lower stereoregularity. This is completely unexpectedly since the external donor in a titanium based catalyst system is used to increase the stereoregularity of a polymer, while by using the external donor according to the present invention it is possible to lower it.

Thus an object of the present application is a process for the preparation of 1-butene homopolymers or 1-butene/alpha olefin copolymers wherein the alpha olefins are selected from ethylene, propylene or alpha olefins of formula $CH_2=CHZ$ wherein Z is a $C_3$-$C_{20}$ alkyl radical, comprising contacting 1-butene or 1 butene and one or more alpha olefins under polymerization conditions in the presence of a catalyst system comprising:

(a) a solid component comprising a Ti compound and an internal electron-donor compound supported on $MgCl_2$
(b) an alkylaluminum cocatalyst; and
(c) a compound of formula (I) as external donor

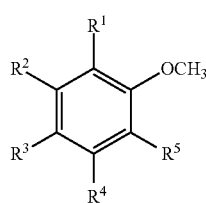

(I)

Wherein:

$R^1$, $R^2$, $R^3$, $R^4$ and $R^5$ equal to or different from each other, are hydrogen atoms or $C_1$-$C_{20}$ hydrocarbon radicals; or two $R^1$, $R^2$, $R^3$ and $R^4$ can be joined to form a $C_5$-$C_{20}$, preferably a $C_5$-$C_{10}$ saturated or unsaturated ring such as a phenyl or a naphtyl ring. Preferably $R^1$, $R^2$, $R^3$, $R^4$ and $R^5$ are hydrogen atoms or linear or branched, $C_1$-$C_{20}$-alkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or two $R^1$, $R^2$, $R^3$ $R^4$ and $R^5$ can be joined to form a $C_5$-$C_{10}$ saturated or unsaturated ring; more preferably $R^1$, $R^2$, $R^3$ $R^4$ and $R^5$ are hydrogen atoms.

Magnesium dichloride in active form is preferably used as a support. It is widely known from the patent literature that magnesium dichloride in active form is particularly suited as a support for Ziegler-Natta catalysts. In particular, U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium, X is halogen, preferably chlorine, y is a number between 1 and n and R is a hydrocarbon radical having 1-18 carbon atoms, can be used.

The internal electron-donor compound is preferably selected from esters and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Preferred internal donors are $C_1$-$C_{20}$ alkyl esters of phthalic acids, possibly substituted. Particularly preferred are the $C_1$-$C_6$ linear or branched alkyl esters. Specific examples are, diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, di-isobutylphthalate Generally, the internal electron donor compound is used in molar ratio with respect to the $MgCl_2$ of from 0.01 to 1 preferably from 0.05 to 0.5.

The preparation of the solid catalyst component can be carried out according to several methods.

According to one preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with the Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The internal electron donor compound can be added during the treatment with TiCl$_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001. The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The alkyl-Al compound (b) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The external electron donor compound (C) is fed in such an amount to give a molar ratio between the organoaluminum compound and said electron donor compound (Al/ED) higher than 2 preferably it is comprised between 4 and 1000, more preferably between 10 an 200, even more preferably between 20 and 150.

It is also possible to pre-polymerize said catalyst in a prepolymerization step. Said prepolymerization can be carried out in liquid, (slurry or solution) or in the gas-phase, at temperatures generally lower than 100° C., preferably between 20 and 70° C. The pre-polymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component.

The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

The polymerization is generally carried out at temperature of from 20 to 120° C., preferably of from 40 to 90° C. The polymerization can be carried out in one or more reactors that can work under same or different reaction conditions such as concentration of molecular weight regulator, comonomer concentration, external electron donor concentration, temperature, pressure etc. When two or more are employed the set up can be in the cascade mode where monomer/catalyst/polymer reaction mixture coming from the first reactor is fed to the successive one. Alternatively, in the parallel set up, two or more reactors with their own feeding systems work independently and the monomer/catalyst/polymer reaction mixture coming from these reactors are collected together and directed to the finishing section. Working in at least two reactors under different conditions can lead to the preparation of butene-1 (co)polymers with different average molecular weight and/or different stereoregularity in the two reactors. Moreover, working in more than one reactor under different conditions has the advantage that the various polymerization stages can be properly modulated so as to properly tailoring the properties of the final polymer. This technique can be adopted when products having a very high amount of xylene soluble fractions are to be produced. These products in fact, can give problems during certain operations such as pelletization. The applicant noted that producing two polymers having a different content of xylene insoluble fraction in two distinct reactor in series gives raise to a final polymer that is better processable than the product deriving from only one polymerization stage having the same amount of final xylene insoluble fraction. This can be done for example by using only in one or more selected reactors a small amount of external donor that allows the catalyst to be more stereospecific. The (co)polymer obtained from the two-stage polymerization can have the same uses as the copolymer obtained via a single set of polymerization conditions.

With the process of the present invention it is possible to obtain a polymer with very low isotacticity, i.e. the mmmm pentads are comprised between 15% and 50%, preferably between 10% and 26% even more preferably between 20% and 23%, and a low value of xylene insolubles at 25° C. with good elastomeric properties. Furthermore the 4,1 inserted butene units are absent.

With the process of the present invention it is possible to obtain 1-butene homopolymers and 1-butene/alpha olefin copolymers wherein the alpha olefins are selected from ethylene, propylene or alpha olefins of formula CH$_2$=CHZ wherein Z is a C$_3$-C$_{20}$ alkyl radical, examples of alpha olefins of formula CH$_2$=CHZ are: 1-pentene, 4-methyl-1-pentene, 1-hexene, 1-octene, 4,6-dimethyl-1-heptene, 1-decene, 1-dodecene. Preferably 1-butene homopolymer, 1-butene/ethylene, 1-butene/propylene or 1-butene/hexane are obtained.

The amount of comonomer in the 1-butene copolymers obtained with the process of the present invention preferably ranges from 0.1 to 20% by mol; preferably from 1% to 15% by mol; even more preferably from 2% to 10% by mol.

As mentioned above, the copolymers of the invention are suitable for use in many applications. As a customary routine, for each of these applications the relevant experts can add further polymer components, additives (such as stabilizers, antioxidants, anticorrosives, nucleating agents, processing aids, oils, etc.) and both organic and inorganic fillers which can impart specific properties, without departing from the gist of the invention.

EXAMPLES

Characterization $^{13}$C NMR Analysis $^{13}$C-NMR spectra were performed on a polymer solution (8-12% wt) in dideuterated 1,1,2,2-tetrachloro-ethane at 120° C. The $^{13}$C-NMR spectra were acquired on a Bruker DPX-400 spectrometer operating at 100.61 MHz in the Fourier transform mode at 120° C. using a 90° pulse, 15 seconds of delay between pulses and CPD (WALTZ65_64pl) to remove $^1$H-$^{13}$C coupling.

About 1500-2000 transients were stored in 32K data points using a spectral window of 60 ppm (0-60 ppm).

Comonomer content in Butene/Propylene Copolymers

The propylene content was obtained from diad distribution ([P]=[PP]+0.5[PB]) which are calculated as:

$$PP = A/\Sigma \quad BP = B/\Sigma \quad BB = C/\Sigma$$

Where $\Sigma = A+B+C$ and A, B, C, are the integrals of the peaks in the $^{13}$C-NMR spectrum (The peak at 27.73 ppm due the $CH_2$ carbon in the branch of an isotactic BBBBB pentad is used as internal reference). The assignment of these peaks are made according to H. N. Cheng, *Journal of Polymer Science, Polymer Physics Edition*, 21, 573 (1983) and are reported in Table A.

TABLE A

| Area | Chemical Shift | Assignments | Sequence |
|---|---|---|---|
| A | 47.2-46.5 | $CH_2$ chain | PP |
| B | 43.7-43.4 | $CH_2$ chain | PB |
| C | 40.0- | $CH_2$ chain | BB |

Determination of mmmm % by $^{13}$C NMR

The assignment of the pentad signals in the region of branch methylene carbons was made according to *Carbon-13 NMR Spectral Assignment of Five Polyolefins Determined from the Chemical Shift Calculation and the Polymerization Mechanism*, T. Asakura and others, *Macromolecules* 1991, 24 2334-2340.

The mmmm % reported in Table 1 is calculated as 100 $(I_{mmmm})/(I_{tot})$

Determination of 4,1 Inserted Butene Units

The absence of 4,1 butene units in either butene homopolymers or butene/propylene copolymers was verified via $^{13}$C-NMR spectroscopy using the above-mentioned experimental conditions and the assignments according to V. Busico, R. Cipullo, A. Borriello, *Macromol. Rapid. Commun.* 16, 269, (1995) reported Table B.

TABLE B

| Peak | Chemical Shift (ppm) | Carbon | Sequence |
|---|---|---|---|
| Q | 37.3 | CH | —$\underline{C}$H($CH_2CH_3$)—($CH_2$)$_5$—$\underline{C}$H($CH_2CH_3$)— |

MWD Determination by Gel Permeation Chromatography (GPC)

This is determined using a Waters 150-C ALC/GPC system equipped with a TSK column set (type GMHXL-HT) working at 135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour. The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) were used as standard. The universal calibration for PB copolymers was performed by using a linear combination of the Mark-Houwink constants for PS (K=7.11·10$^{-5}$ dl/g; α=0.743) and PB (K=1.18·10$^4$ dl/g; α=0.725)

Thermal Properties

The melting points of the polymers ($T_m$) and the melting enthalpy ($\Delta H_m$) were measured by Differential Scanning calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. The peak temperature was taken as the melting temperature ($T_m$) and the area of the peak as the melting enthalpy ($\Delta H_f$) in either the first or the second heating run.

Determination of Shore A and D

Measured according to ASTM D2240

Tensile Properties

Measured according to ISO 527-Tensile on a 1.9 mm thick plaque obtained by compression molding (at 200° C. with an cooling of 30°/min) of a polymer composition obtained by mixing in a Brabender the relevant copolymer sample with 1% 2,6-di-t-butyl-4-methyl phenol (BHT) at 180° C. Except where otherwise stated all mechanical measurements have been carried out after the specimens have been kept for 10' in autoclave at room temperature and 2 kbar pressure.

Compression Set

Measured according to ASTM D395B type 1 on compression molded samples that have been treated for 1 minute in autoclave at room temperature and 2 kbar. The so obtained specimens were compressed 25% of the original thickness and put in an oven at 70° C. or 23° C. for 22 hours.

Determination of Xylene Insoluble Fraction

In order to determine the fraction insoluble in xylene at 0° C. (X.I. %), 2.5 g of polymer are dissolved under agitation in 250 ml of xylene at 135° C., and after 20 minutes the solution is allowed to cool to 0° C. After 30 minutes the precipitated polymer is filtered and dried at reduced pressure at 80° C. until constant weight is reached.

Intrinsic Viscosity [η]

Determined in tetrahydronaphthalene at 135° C. (ASTM 2857-70).

Preparation of Solid Catalyst Component

Into a 500 ml four-necked round flask, purged with nitrogen, 225 ml of $TiCl_4$ were introduced at 0° C. While stirring, 6.8 g of microspheroidal $MgCl_2 \cdot 2.7 C_2H_5OH$ (prepared as described in Ex. 2 of U.S. Pat. No. 4,399,054 but operating at 3,000 rpm instead of 10,000 rpm) were added.

The flask was heated to 40° C. and 4.4 mmoles of diisobutylphthalate were thereupon added. The temperature was raised to 100° C. and maintained for two hours, then the stirring was discontinued, the solid product was allowed to settle and the supernatant liquid was siphoned off.

200 ml of fresh $TiCl_4$ were added, the mixture was reacted at 120° C. for one hour then the supernatant liquid was siphoned off.

200 ml of fresh $TiCl_4$ were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Polymerization Example 1 and Comparative 1

General Procedure of 1-butene Polymerization

A 4 liter stainless steel autoclave was purged with nitrogen flow at 70° C. for one hour, 3.5 mmol of $AliBu_3$ (TIBA, solution 10% wt in hexane) were supplied and the autoclave was then closed. At room temperature, 1.35 Kg of liquid butene-1 were fed and, when required, the desired amount of hydrogen (see Table 1) was charged in the autoclave. Finally, the internal temperature was raised to 74° C.

At the same time, 20 mg of solid catalyst component, prepared as reported above, were suspended in 75 ml of anhydrous hexane containing 3.5 mmol of TIBA and 0.35 mmol of the external donor (ED) reported in Table 1.

The activated catalyst suspension was then charged in the autoclave with a nitrogen overpressure and the internal autoclave temperature was set to 75° C.

The polymerization was carried out at this temperature for 2 hours. After that the reaction was stopped, the unreacted 1-butene was vented and the polymer was recovered and dried at 70° C. under vacuum for six hours.

The polymerization data and the polymer characterization are reported in Table 1.

| Ex | External donor | Productivity Kg/g | XI % | mmmm % | η dL/g | Mw/Mn | 4,1 inserted butene units |
|---|---|---|---|---|---|---|---|
| 1 | metossi benzene (Anisole) | 23.1 | 7.6 | 21.7 | 2.85 | 4.0 | absent |
| C-1 | none | 14.65 | 16.9 | 28 | 2.70 | 4.9 | absent |

C-1 = comparative example 1
XI = insoluble in xylene

From table 1 clearly results that when the polymerization is carried out according to the process of the present invention it is possible to obtain a 1-butene polymer having an higher molecular weight and a lower degree of isotacticity.

The invention claimed is:

1. A process for the preparation of 1-butene homopolymers or 1-butene/alpha olefin copolymers comprising the step: contacting
   (i) 1-butene or
   (ii) 1-butene and at least one alpha olefin wherein the alpha olefin is present in 0.1 to 20 mol % and wherein the alpha olefin is selected from ethylene, propylene or alpha olefins of formula CH$_2$=CHZ wherein Z is a C$_3$-C$_{20}$ alkyl radical with a catalyst system under polymerization conditions wherein the catalyst system comprises:

(a) a solid component comprising a Ti compound and an internal electron-donor compound supported on MgCl$_2$;
(b) an alkylaluminum cocatalyst; and
(c) a compound of formula (I) as external donor

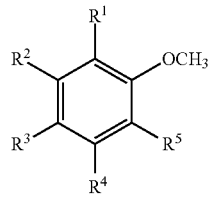

(I)

wherein:
R$^1$, R$^2$, R$^3$ R$^4$ and R$^5$ equal to or different from each other, are hydrogen atoms or C$_1$-C$_{20}$ hydrocarbon radicals; or two R$^1$, R$^2$, R$^3$ and R$^4$ can be joined to form a C$_5$-C$_{20}$, saturated or unsaturated ring.

2. The process according to claim 1 wherein in the compound of formula (I), R$^1$, R$^2$, R$^3$ and R$^4$ are hydrogen atoms or linear or branched, C$_1$-C$_{20}$-alkyl, or two R$^1$, R$^2$, R$^3$, R$^4$ are joined to form a C$_5$-C$_{10}$ saturated or unsaturated ring.

3. The process according to claim 1 wherein the internal donor is selected from alkyl, cycloalkyl or aryl esters of mono carboxylic acids, the said alkyl, cycloalkyl or aryl groups having from 1 to 18 carbon atoms.

4. The process according to claim 3 wherein the internal donors are C$_1$-C$_{20}$ alkyl esters of phthalic acids.

5. The process according to claim 1 wherein the external electron donor compound (C) is fed in such an amount to give a molar ratio between the organoaluminum compound and said electron donor compound (Al/ED) higher than 2.

6. The process according to claim 5 wherein the molar ratio between the organoaluminum compound and the electron donor compound C (Al/ED) is between 4 and 1000.

7. The process of claim 3 wherein the internal donor is selected from benzoic acids, or polycarboxylic acids.

8. The process according to claim 4 wherein the internal donors are substituted C$_1$-C$_{20}$ alkyl esters of phthalic acids.

* * * * *